United States Patent
Kim (10) Patent No.: US 9,143,717 B2
(45) Date of Patent: Sep. 22, 2015

(54) BROADCAST RECEIVER AND METHOD OF PROVIDING PREFERRED CHANNEL THEREOF

(75) Inventor: Dong Sik Kim, Gumi-si (KR)

(73) Assignee: LG ELECTRONICS INC., Seoul (KR)

( * ) Notice: Subject to any disclaimer, the term of this patent is extended or adjusted under 35 U.S.C. 154(b) by 936 days.

(21) Appl. No.: 12/442,992

(22) PCT Filed: May 21, 2007

(86) PCT No.: PCT/KR2007/002455
§ 371 (c)(1),
(2), (4) Date: Oct. 28, 2009

(87) PCT Pub. No.: WO2008/038881
PCT Pub. Date: Apr. 3, 2008

(65) Prior Publication Data
US 2010/0045868 A1    Feb. 25, 2010

(30) Foreign Application Priority Data

Sep. 28, 2006 (KR) .................. 10-2006-0094630

(51) Int. Cl.
*H04N 5/445* (2011.01)
*H04N 5/45* (2011.01)
(Continued)

(52) U.S. Cl.
CPC ............. *H04N 5/45* (2013.01); *H04N 5/44591* (2013.01); *H04N 21/2365* (2013.01);
(Continued)

(58) Field of Classification Search
CPC ............ H04N 21/482; H04N 21/4532; H04N 21/44222; H04N 21/25891; H04N 5/44543; G06F 8/34
USPC ........ 348/731, E5.097, 563–569; 725/36–46, 725/47
See application file for complete search history.

(56) References Cited

U.S. PATENT DOCUMENTS 5,045,946 A * 9/1991 Yu .................................. 348/565
5,247,365 A * 9/1993 Hakamada et al. ........... 348/732
(Continued)

FOREIGN PATENT DOCUMENTS

| CN | 1419782 A | 5/2003 |
| CN | 1746816 | 3/2006 |

(Continued)

OTHER PUBLICATIONS

European Search Report dated Jun. 16, 2010 issued in Application No. 07 746 603.
(Continued)

*Primary Examiner* — Brian Yenke
*Assistant Examiner* — Humam Satti
(74) *Attorney, Agent, or Firm* — Ked & Associates, LLP (57) ABSTRACT

A broadcast receiver and method of providing a preferred channel thereof are disclosed. The present invention includes receiving a program of the preferred channel (52) set by a user among a plurality of broadcast channels, transforming an image of the received program of the preferred channel into a reduced image (54) and storing the reduced image per the preferred channel. Accordingly, when a turn-on mode of the broadcast receiver is switched to a turn-off mode (56) of the broadcast receiver, when a turn-off mode (56) of the broadcast receiver is switched to a turn-on mode of the broadcast receiver, or when a display of a preferred channel is requested in a turned-on mode, a per preferred channel reduced image is displayed as OSD (60) on a currently viewed image. So, a user is facilitated to recognize and select a program received on the preferred channel without blocking the currently viewed image.

33 Claims, 9 Drawing Sheets

(51) Int. Cl.
*H04N 21/2365* (2011.01)
*H04N 21/431* (2011.01)
*H04N 21/434* (2011.01)
*H04N 21/4402* (2011.01)
*H04N 21/462* (2011.01)
*H04N 21/475* (2011.01)
*H04N 21/45* (2011.01)

(52) U.S. Cl.
CPC ...... *H04N 21/4316* (2013.01); *H04N 21/4347* (2013.01); *H04N 21/440263* (2013.01); *H04N 21/4621* (2013.01); *H04N 21/4755* (2013.01); *H04N 21/4532* (2013.01)

(56) References Cited

U.S. PATENT DOCUMENTS

| | | | |
|---|---|---|---|
| 5,323,240 A | 6/1994 | Amano et al. | |
| 5,801,698 A * | 9/1998 | Lection et al. | 715/861 |
| 6,738,559 B1 * | 5/2004 | Yoo et al. | 386/231 |
| 7,532,253 B1 * | 5/2009 | Greenberg | 348/565 |
| 7,765,416 B2 * | 7/2010 | Zhou et al. | 713/320 |
| 7,830,459 B2 * | 11/2010 | Nadarajah | 348/732 |
| 8,462,178 B2 * | 6/2013 | Yoshikawa et al. | 345/629 |
| 2002/0010922 A1 * | 1/2002 | Darin et al. | 725/32 |
| 2003/0115589 A1 * | 6/2003 | D'Souza et al. | 725/10 |
| 2004/0165000 A1 * | 8/2004 | Nagahashi et al. | 345/629 |
| 2004/0221306 A1 * | 11/2004 | Noh | 725/44 |
| 2005/0036068 A1 * | 2/2005 | Shin | 348/565 |
| 2005/0110871 A1 * | 5/2005 | Ida | 348/173 |
| 2005/0219423 A1 * | 10/2005 | Kamise et al. | 348/730 |
| 2006/0037045 A1 * | 2/2006 | Hsieh | 725/43 |
| 2006/0059380 A1 | 3/2006 | Kimura | 713/323 |
| 2006/0087593 A1 | 4/2006 | Liebhold et al. | |
| 2006/0109384 A1 * | 5/2006 | Miller-Smith et al. | 348/730 |
| 2006/0190965 A1 | 8/2006 | Lin et al. | 725/46 |
| 2006/0224987 A1 * | 10/2006 | Caffarelli | 715/767 |
| 2006/0225122 A1 * | 10/2006 | Aratani et al. | 725/139 |
| 2006/0280449 A1 * | 12/2006 | Ogawa et al. | 386/95 |
| 2007/0006256 A1 * | 1/2007 | Park | 725/38 |
| 2007/0061748 A1 * | 3/2007 | Hirose | 715/764 |
| 2007/0186266 A1 * | 8/2007 | Watson et al. | 725/134 |
| 2008/0098426 A1 * | 4/2008 | Candelore | 725/38 |
| 2008/0229351 A1 * | 9/2008 | Torimaru | 725/14 |
| 2009/0169175 A1 * | 7/2009 | Hong et al. | 386/83 |
| 2009/0195702 A1 * | 8/2009 | Eshleman | 348/730 |

FOREIGN PATENT DOCUMENTS

| | | |
|---|---|---|
| EP | 1 096 793 A2 | 5/2001 |
| JP | H06-303543 | 10/1994 |
| KR | 1997-0057320 | 7/1997 |
| KR | 10-0208994 | 4/1999 |
| KR | 10-2006-0015075 | 2/2006 |
| WO | WO 02/01862 A2 | 1/2002 |

OTHER PUBLICATIONS

Chinese Office Action dated Aug. 11, 2010 issued in Application No. 200780036377.0.
International Search Report dated Oct. 8, 2007.
Korean Notice of Allowance dated May 31, 2013.

* cited by examiner

BROADCAST RECEIVER AND METHOD OF PROVIDING PREFERRED CHANNEL THEREOF

CROSS-REFERENCE TO RELATED PATENT APPLICATIONS

This application is a U.S National Stage Application under 35 U.S.C. §371 of PCT Application No. PCT/KR2007/002455, filed May 21, 2007, which claims priority to Korean Patent Application No. 10-2006-0094630, filed Sep. 28, 2006, whose entire disclosures are hereby incorporated by reference.

TECHNICAL FIELD

The present invention relates to a broadcast receiver such as a television, a set-top box, and the like, and more particularly, to a method of providing a channel preferred by a user, and a broadcast receiver performing the method.

BACKGROUND ART

Generally, the rapid developments of digital broadcasting enable a broadcast of high image and audio qualities to be viewed via satellite, terrestrial, or cable. Compared to analog broadcasting provided by the general analog television, digital broadcasting is capable of providing various additional services as well as high video and audio qualities. Moreover, owing to the expansions of the audio/video compression technique and the transmission/compression technique, digital broadcasting has broadcast channels more than that of analog broadcasting.

Meanwhile, it takes a considerable time for a user to search a number of channels for a specific one. To reduce the search time, a method of providing a preferred channel according to a related art is schematically explained with reference to FIG. 1 as follows.

Figure 1:
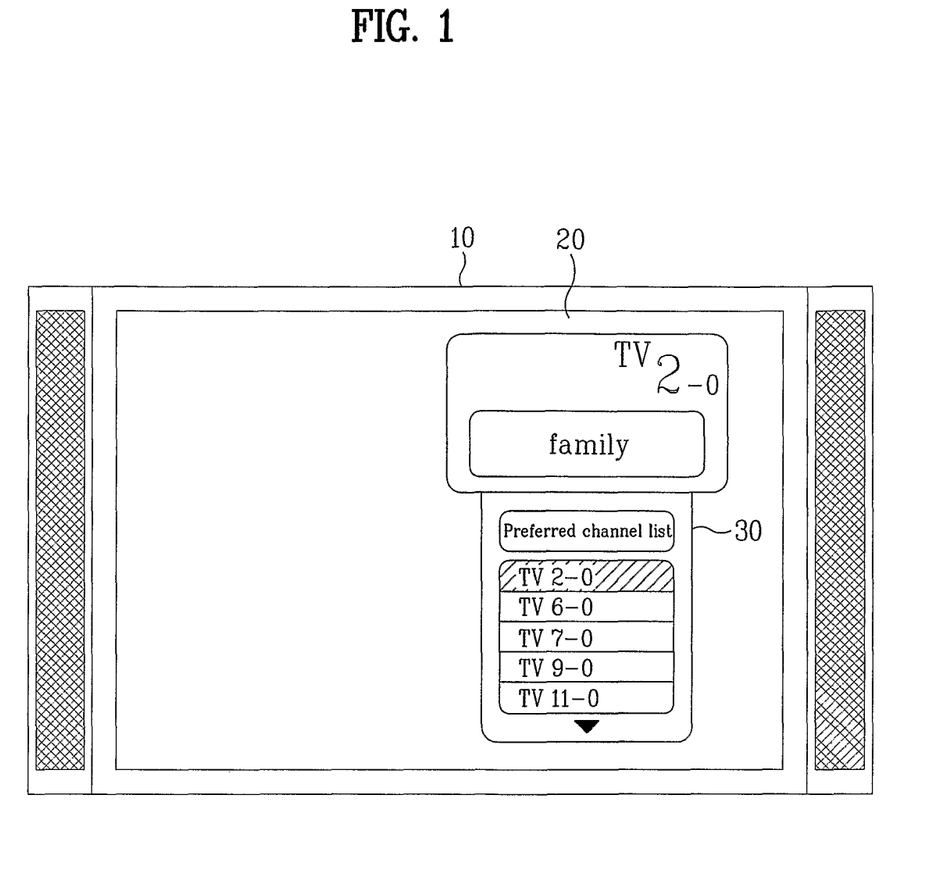
FIG. 1 us an exemplary diagram to explain a preferred channel providing method according to a related art.

First of all, a user registers to store a specific channel preferred by the user. A preferred channel list 30, which has been set by the user in a manner of manipulating a preferred channel key of a user interface unit (not shown in the drawing), is provided to a screen 20 of a TV 10, as shown in FIG. 1, while the user is watching the TV 10. So, the user is facilitated to select a preferred channel via the preferred channel list 30.

However, the related art preferred channel providing method provides the preferred channel list containing preferred channel numbers only to user. So, since the user is unable to know what kind of program is currently provided on a corresponding channel, it is troublesome for the user to switch a current channel to the corresponding channel.

DISCLOSURE OF INVENTION

Accordingly, the present invention is directed to a broadcast receiver and method of providing a preferred channel thereof that substantially obviate one or more problems due to limitations and disadvantages of the related art.

An object of the present invention is to provide a broadcast receiver and method of providing a preferred channel thereof, by which a user is provided with a reduced image of a program according to a preferred channel set by the user, under the predetermined condition.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of providing a preferred channel in a broadcast receiver according to the present invention includes the steps of receiving a program of the preferred channel set by a user among a plurality of broadcast channels, transforming an image of the received program of the preferred channel into a reduced image, and storing the reduced image per the preferred channel.

In another aspect of the present invention, a method of providing a preferred channel in a broadcast receiver includes the steps of receiving a program of the preferred channel set by a user among a plurality of broadcast channels, transforming an image of the received program of the preferred channel into a reduced image, extracting program information for the preferred channel from additional data included in the received program of the preferred channel, storing the reduced image and the extracted program information per the preferred channel, and displaying the stored reduced image per the preferred channel.

In another aspect of the present invention, a broadcast receiver, which performs a preferred channel providing method, includes at least one main tuner receiving a program currently viewed by a user, at least one sub-tuner receiving a program of a preferred channel in response to a tuning control signal, and a central processing unit generating the tuning control signal according to the preferred channel set by the user among a plurality of broadcast channels, the central processing unit transforming an image of the received program of the preferred channel into a reduced image.

In another aspect of the present invention, a broadcast receiver, which performs a preferred channel providing method, includes at least one main tuner receiving a program currently viewed by a user, at least one sub-tuner receiving a program of a preferred channel in response to a tuning control signal, a central processing unit generating the tuning control signal according to a number of the preferred channel set by the user among a plurality of broadcast channels, the central processing unit transforming an image of the received program of the preferred channel into a reduced image, the central processing unit extracting program information for the preferred channel from additional data included in the received program of the preferred channel, a display unit displaying the reduced image under a control of the central processing unit, and a user interface unit having a number of the preferred channel set by the user, the user interface unit outputting the number of the preferred channel to the central processing unit.

It is to be understood that both the foregoing general description and the following detailed description of the present invention are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts.

First of all, preferred channel providing methods according to embodiments of the present invention are explained with reference to FIGS. 2 to 6 in the following description. In particular, a broadcast receiver capable of performing a method of providing a preferred channel according to the present invention can include a television (TV), a set-top box (STB), and the like. To help the understanding of the present invention, it is assumed in the following description that the broadcast receiver is a television (TV), which does not put limitation of the present invention.

Figure 2:
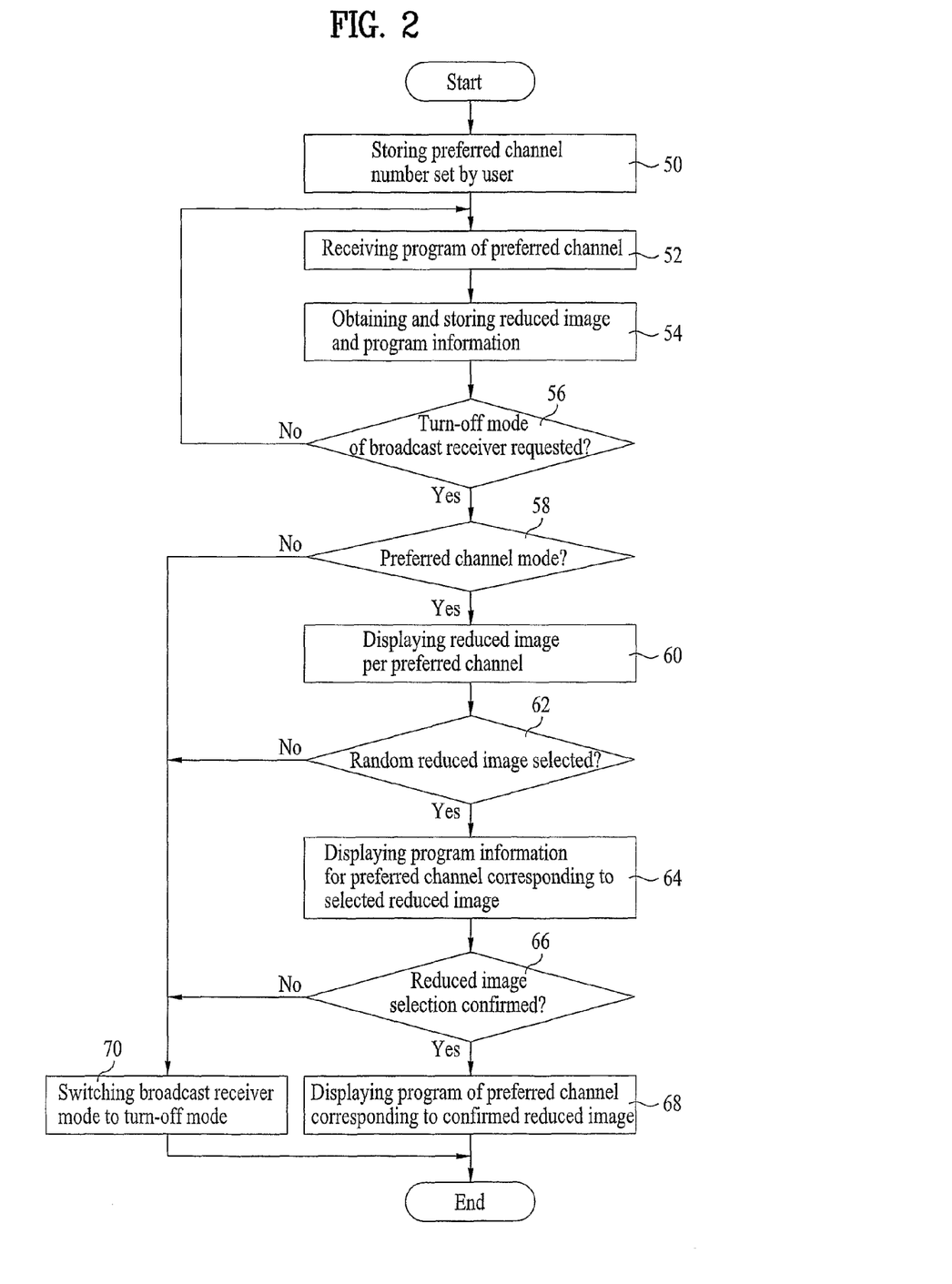
FIG. 2 is a flowchart of a method of providing a preferred channel according to one embodiment of the present invention.

FIG. 2 is a flowchart of a method of providing a preferred channel according to one embodiment of the present invention.

Referring to FIG. 2, in a method of providing a preferred channel according to one embodiment of the present invention, if a user makes a request for a switching to a turn-off mode of a TV for not viewing a broadcast from a turn-on mode of the TV for viewing a broadcast, a per preferred channel reduced image is provided to the user. Besides, the preferred channel providing method shown in FIG. 2 is carried out while a broadcast receiver is in a turn-on mode only. The preferred channel providing method shown in FIG. 2 is explained in detail as follows.

First of all, a turn-on mode of a TV means a mode enabling a user to view a program, while a turn-off mode of a TV means a mode disabling a user to view a program. In particular, the turn-off mode is divided into a complete turn-off mode and a warm standby mode. In this case, the complete turn-off mode means that a minimum power necessary for a user to turn on a TV, i.e., for a TV to enter a turn-on mode is being supplied to the TV. And, the warm standby mode means that a display panel of a TV is turned off while a power is supplied to a TV board to internally operate in the turn-on mode. In the warm standby mode, since a video signal of a currently received program is not provided to a user by cutting off a power to a display panel, the user recognizes as if a power of a TV is turned off.

In case that a user sets up a number of a preferred channel, the set number of the preferred channel is stored (S50). In particular, if a user sets a preference priority of each channel, the preference priority is stored by being matched to the corresponding preferred channel.

After completion of the step S50, a program provided on the preferred channel corresponding to the stored number is received (S52). In this case, a TV is capable of receiving a program currently viewed by the user while the step S52 is executed. For this, the TV includes a plurality of tuners.

After completion of the step S52, an image of the received program of the preferred channel is transformed into a reduced image. The reduced image (e.g., thumbnail) is then stored (S54). For instance, a reduced image for a random preferred channel can be generated and stored per one minute. And, information for the program of the preferred channel is extracted from additional data included in the received program of the preferred channel. The extracted program information is stored by being matched to the reduced image (S54). In this case, the program information includes a number of a preferred channel, a program title, screen ratio information, program running timer and the like. In the step S54, the reduced image and the program information are stored per the preferred channel.

After completion of the step S54, it is decided whether a user makes a request for a switching to a TV turn-off mode from a TV turn-on mode (S56). If it is decided that the user does not make a request for a switching to a TV turn-off mode from a TV turn-on mode, the steps S52 and S54 are repeatedly executed.

If it is however decided that the user makes a request for a switching to a TV turn-off mode from a TV turn-on mode, it is decided whether a channel mode of the TV is a preferred channel mode (S58). In this case, a preferred channel mode means a mode previously set by a user to provide a per preferred channel reduced image.

If the channel mode of the TV is not the preferred channel mode, since the switching to the turn-off mode is requested, a mode of the TV is switched to the turned-off mode (S70).

If the channel mode of the TV is however the preferred channel mode, the stored reduced image is displayed per the preferred channel (S60). In the step S60, the reduced image per the preferred channel can be displayed on a whole screen of the TV. Alternatively, the reduced image per the preferred channel can be displayed as an OSD (on-screen display) on an image of a program currently viewed by the user.

Various methods of displaying the reduced image in the step S60 according to the present invention are explained with reference to the attached drawings as follows.

FIGS. 3A to 3D are diagrams of exemplary reduced image display screens to help the understanding of a method of providing a preferred channel according to the present invention.

In one of the reduced image displaying methods, reduced images respectively corresponding to a plurality of preferred channels can be sequentially displayed one by one. Four reduced images 80, 82, 84, and 86 respectively corresponding to four preferred channels, as shown in FIGS. 3A to 3D, are sequentially displayed on a main screen 110 of a TV 100 one by one.

Figure 4A:
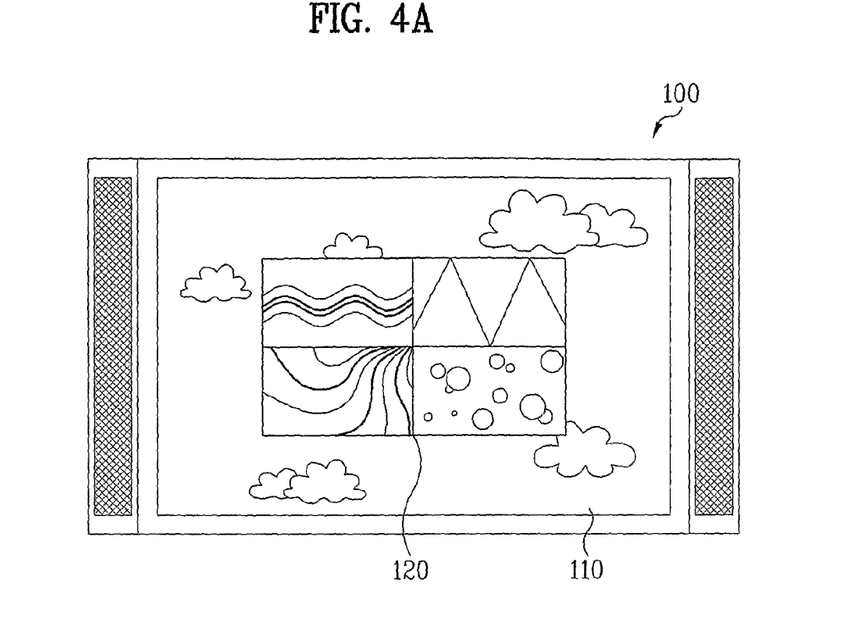
FIGS. 4A to 4C are diagrams of another exemplary reduced image display screens to help the understanding of a method of providing a preferred channel according to the present invention.
Figure 4B:
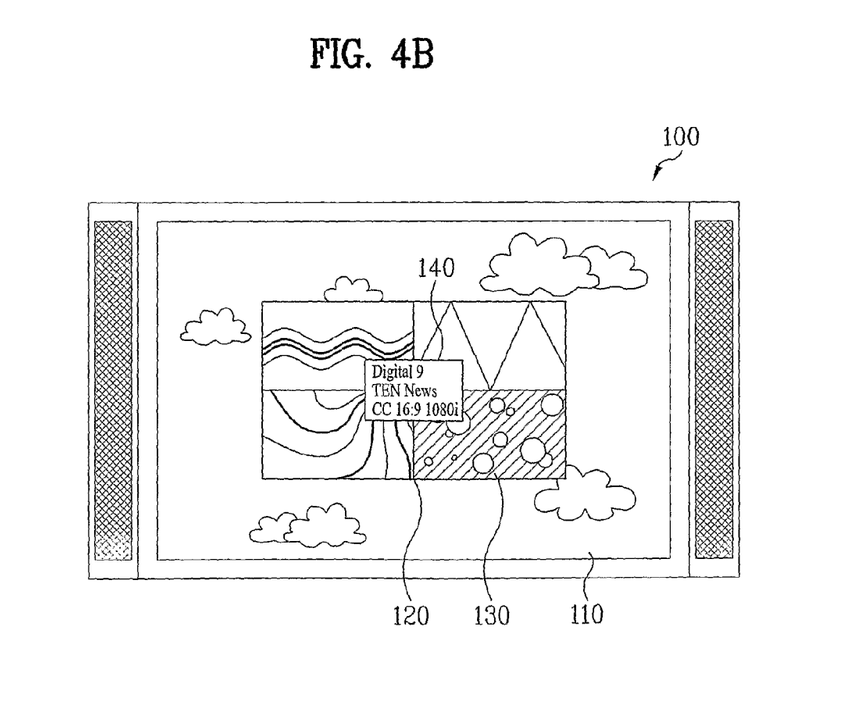
Figure 4C:
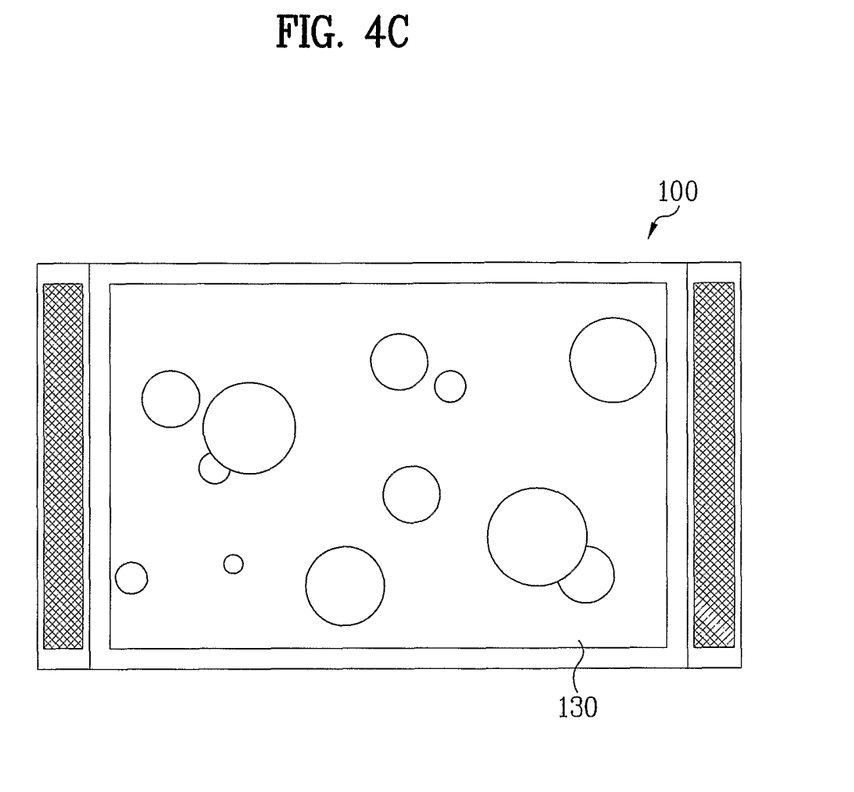

FIGS. 4A to 4C are diagrams of another exemplary reduced image display screens to help the understanding of a method of providing a preferred channel according to the present invention.

In another of the reduced image displaying methods, reduced images respectively corresponding to a plurality of preferred channels can be sequentially and simultaneously displayed two by two at least. In this case, the number of the reduced images to be simultaneously displayed can be decided in advance. In case that four reduced images respectively corresponding to four preferred channels are simultaneously displayed, four reduced images 120 according to four programs respectively received through the four preferred channels, as shown in FIGS. 4A to 4C, are displayed on a main screen 110 of a TV 100.

In still another reduced image displaying method, a plurality of reduced images stored to correspond to one preferred channel can be sequentially displayed for a predetermined period by FRFD (first record first display). In this case, the FRFD means that a reduced image first stored is displayed first. Thus, in case that a plurality of the reduced images stored for one preferred channel are sequentially displayed based on the FRFD, still images for one preferred channel may look like a moving picture to a user.

In still another reduced image displaying method, when the user sets up a preferred channel in the step S50, if a preference priority of the preferred channel is decided, reduced image can be sequentially displayed to a user from a reduced image of a preferred channel having a highest preference priority to that having a lowest preference priority.

In the step S60, a size of the displayed reduced image can be decided in advance by considering the number of reduced images to be simultaneously displayed. In this case, a size of a reduced image can be restricted not to interrupt a user' viewing of a currently viewed program.

Meanwhile, after completion of the step S60, it is decided whether the user selects a random reduced image from the per preferred channel reduced images displayed on the screen (S62).

Figure 3A:
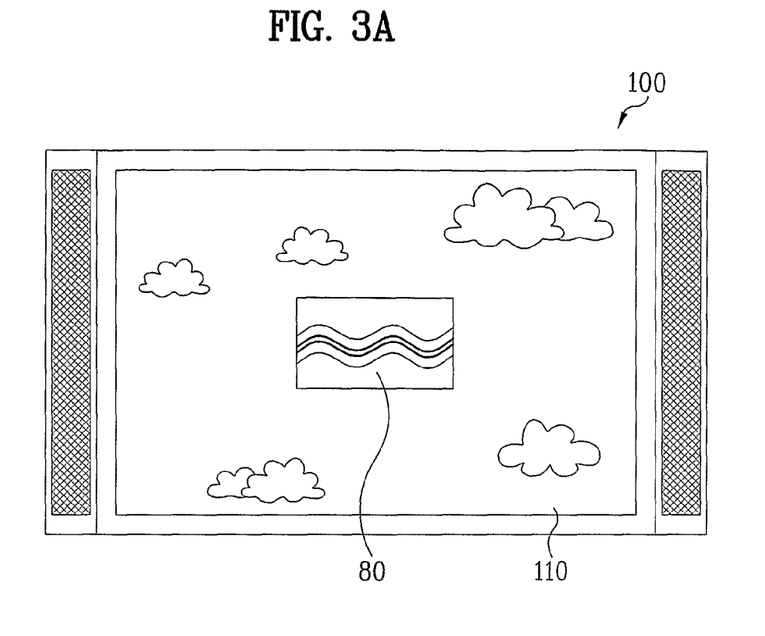
FIGS. 3A to 3D are diagrams of exemplary reduced image display screens to help the understanding of a method of providing a preferred channel according to the present invention.
Figure 3B:
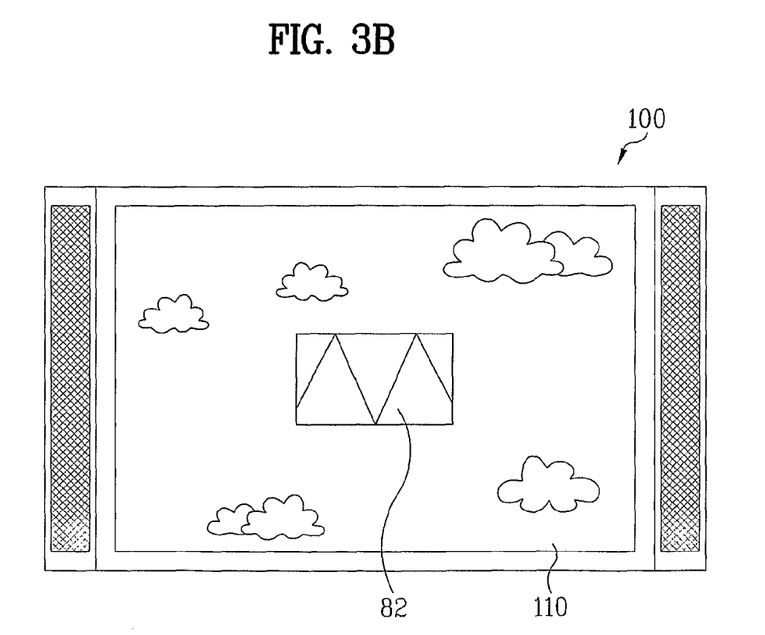
Figure 3C:
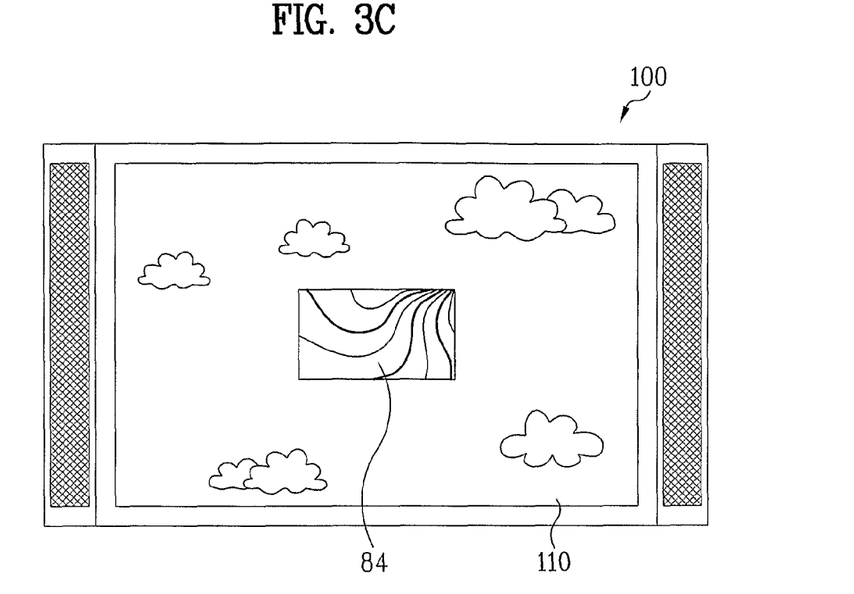
Figure 3D:
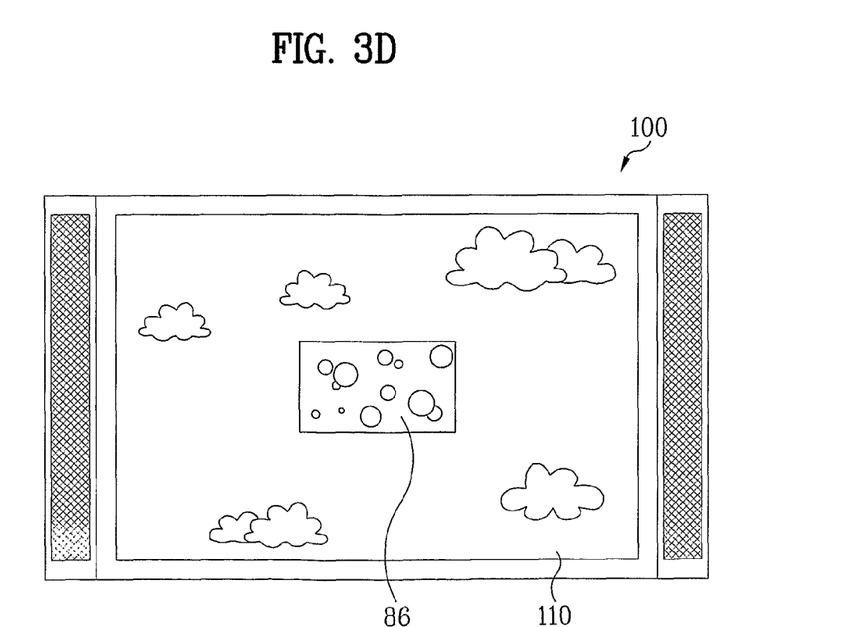

If the random reduced image is not selected by the user within a preset time, a mode of the TV is switched to the turn-off mode (S70). If the random reduced image is however selected by the user, program information of the preferred channel corresponding to the selected reduced image is displayed (S64). Referring to FIG. 4B, if a fourth reduced image 130 is selected by a user from reduced images of four preferred channels which are displayed on a screen, program information 140 corresponding to the fourth reduced image 130 is displayed. Hence, the user is able to obtain detailed information for the selected reduced image from the displayed program information. In this case, the program information, as shown in FIG. 4B, can be displayed as a pop-up type. The reduced image selected by the user can be displayed in a manner of being discriminated from another reduced image unselected by the user. For instance, a reduced image 130 selected by a user, as shown in FIG. 3B, can be displayed as shaded.

Subsequently, it is decided whether the selection of the reduced image in the step S64 is confirmed by the user (S66).

If the selection of the reduced image in the step S64 is not confirmed by the user for a preset period, a mode of the TV is switched to the turn-off mode (S70). If selection of the reduced image is however confirmed by the user, a program of the preferred channel corresponding to the confirmed reduced image is displayed (S68). In particular, after a fourth reduced image 130 has been selected by a user from a plurality of reduced images 120 of a plurality of preferred channels, if the selected reduced image 130 is confirmed by the user, a program received through the preferred channel corresponding to the fourth reduced image 130, as shown in FIG. 4C, is displayed on a whole screen.

Figure 5:
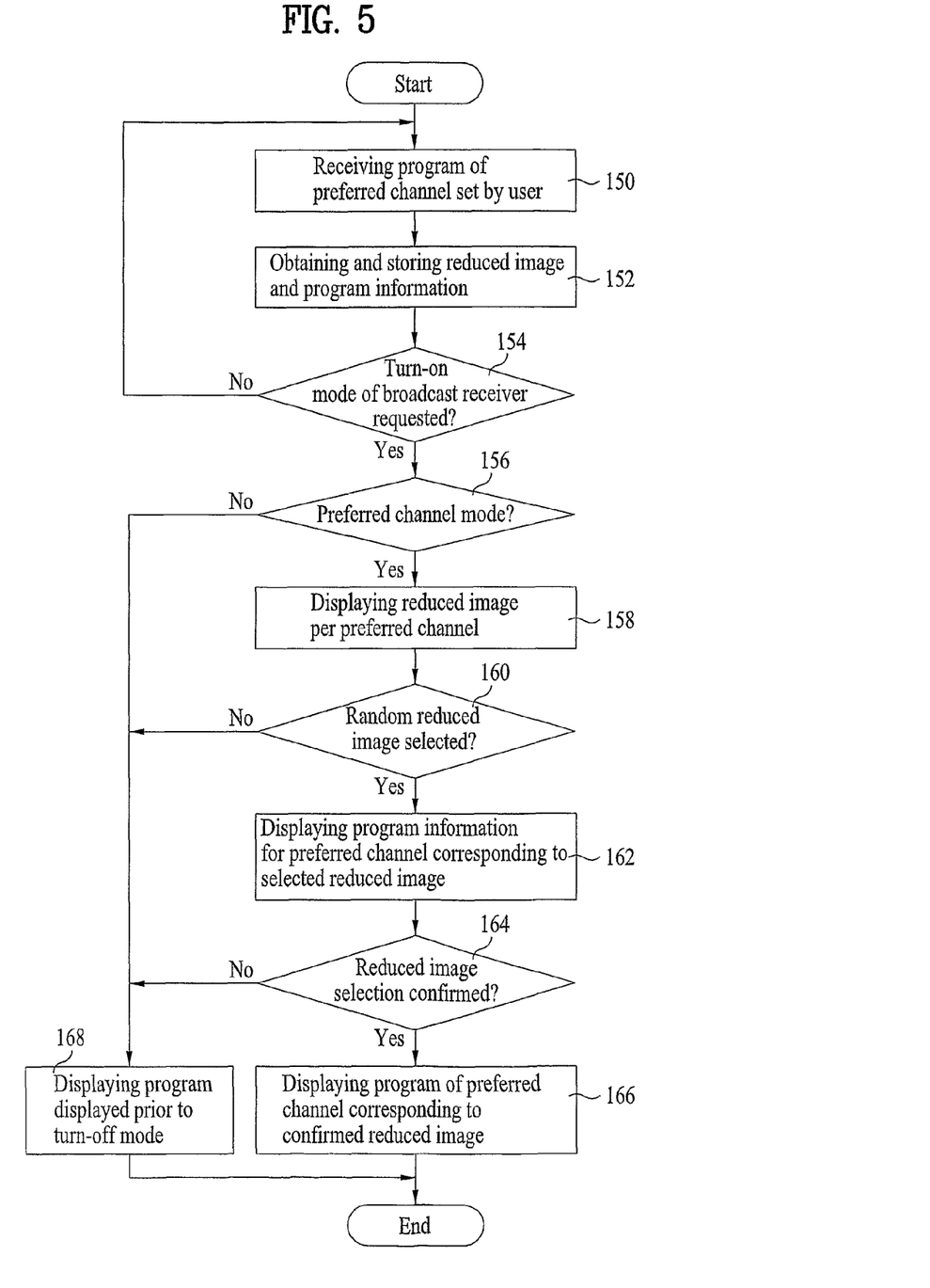
FIG. 5 is a flowchart of a method of providing a preferred channel according to another embodiment of the present invention.

FIG. 5 is a flowchart of a method of providing a preferred channel according to another embodiment of the present invention.

Referring to FIG. 5, in a method of providing a preferred channel according to another embodiment of the present invention, if a user makes a request for a switching to a turn-on mode of a TV for viewing a broadcast from a turn-off mode of the TV for not viewing a broadcast, a per preferred channel reduced image is provided to the user. The preferred channel providing method is explained in detail as follows.

First of all, a number of a channel preferred by a user is set up and then stored. After the storage of the preferred channel number, if a power of the TV is turned off, the TV receives a program carried on the preferred channel corresponding to the number having been set and stored by the user (S150).

After the step S150, an image of the received program of the preferred channel is transformed into a reduced image and the reduced image is then stored (S152). Moreover, program information of the preferred channel is extracted from additional data included in the received program of the preferred channel and the extracted program information and the reduced image are stored per a preferred channel (S152). The steps S150 and S152 are carried out in a warm standby mode. So, if the turn-off mode of the TV shown in FIG. 2 is the warm standby mode, the step S150 shown in FIG. 5 can be executed after the step S70 shown in FIG. 2.

Thereafter, it is decided whether the user attempts to switch the turn-off mode of the TV to the turn-on mode (S154). If the user does not make a request for switching the mode of the TV to the turn-on mode, the steps S150 and S152 are repeatedly executed. If the user makes a request for switching the mode of the TV to the turn-on mode, it is decided whether a channel mode of the TV is a preferred channel mode (S516). If the channel mode of the TV is not the preferred channel mode, a program last displayed in the TV before the turn-off mode of the TV is displayed (S168). If the channel mode of the TV is the preferred channel mode, the per preferred channel reduced image stored in the step S152 is displayed on the screen (S158). In the step S158, the per preferred channel reduced image can be displayed on the whole screen. Alternatively, in the step S158, the per preferred channel reduced image can be displayed as an OSD (on-screen display) while a program provided on the channel, which is last viewed by the user before the user turns off the power of the TV, is being displayed on the screen. And, the reduced image can be displayed by one of the various display methods mentioned in the step S60 (S158). Besides, since steps S160 to S166 are identical to the steps S62 to S68 shown in FIG. 2, their details are omitted in the following description. Hence, the aforesaid description of FIGS. 4A to 4C can be identically applied to another embodiment of the present invention shown in FIG. 5 as well as FIG. 2. Yet, if a random reduced image is not selected or if a selection for a reduced image is not confirmed by the user, a program, which was last displayed before the turn-of mode of the TV, is displayed (S168).

Figure 6:
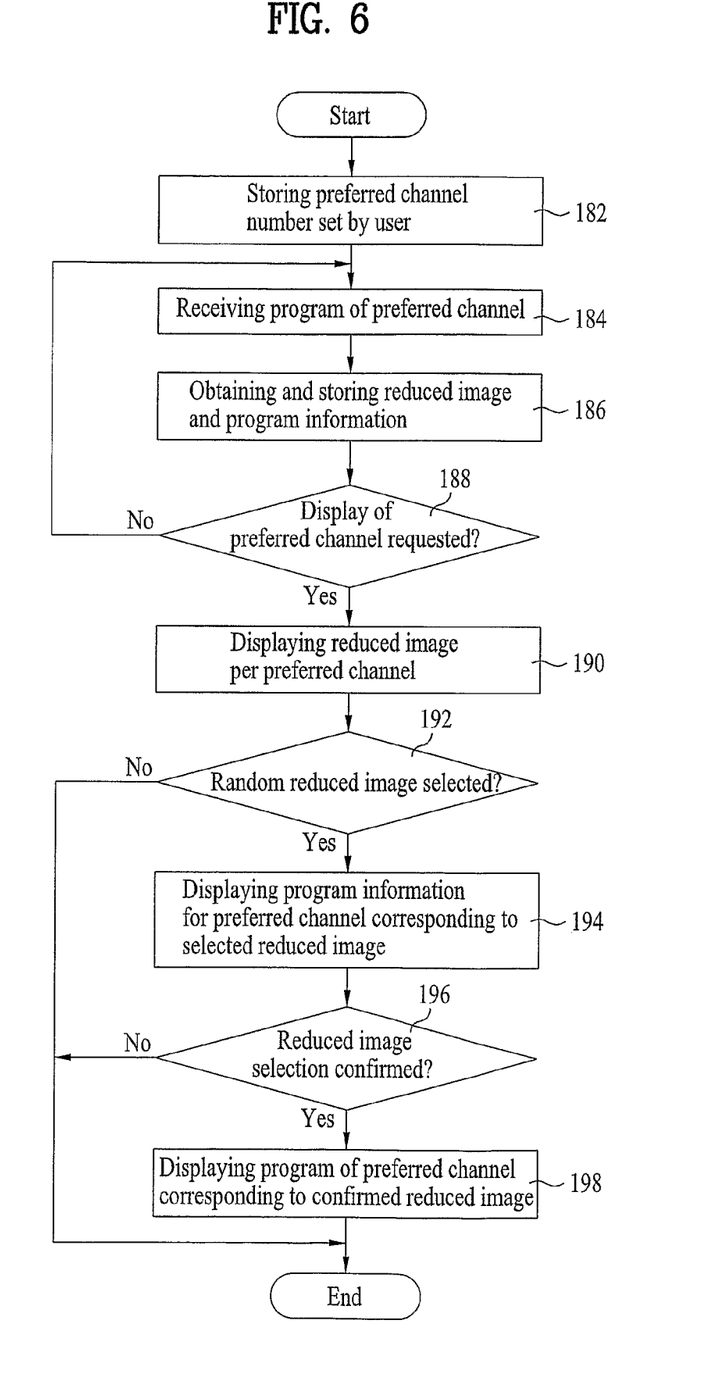
FIG. 6 is a flowchart of a method of providing a preferred channel according to a further embodiment of the present invention.

FIG. 6 is a flowchart of a method of providing a preferred channel according to a further embodiment of the present invention.

In a method of providing a preferred channel according to a further embodiment of the present invention of FIG. 6, in a turn-on mode that a user is viewing a broadcast, if the user attempts to display a per preferred channel reduced image, the per preferred channel reduced image is provided to the user. The preferred channel providing method of FIG. 6 is carried out while a broadcast receiver is in a turn-on mode. The preferred channel providing method shown in FIG. 6 is explained in detail as follows.

First of all, since steps S182, S184, and S186 are identical to the former steps S50, S52, and S54 shown in FIG. 2, their details are omitted in the following description.

While a user is watching TV, it is decided whether a display of a preferred channel is requested (S188). If the user does not make the request for the display of the preferred channel, the steps S184 and S186 are repeatedly executed. If the user however makes the request for the display of the preferred channel, a per preferred channel reduced image is displayed on a screen of the TV (S190). Since the steps S190 to S198 are identical to those of the steps S60 to S68 shown in FIG. 2, their details are omitted in the following description.

A configuration and operation of a broadcast receiver according to the present invention, which carries out the preferred channel providing method shown in FIG. 2, FIG. 5, or FIG. 6, are explained with reference to the attached drawing as follows.

Figure 7:
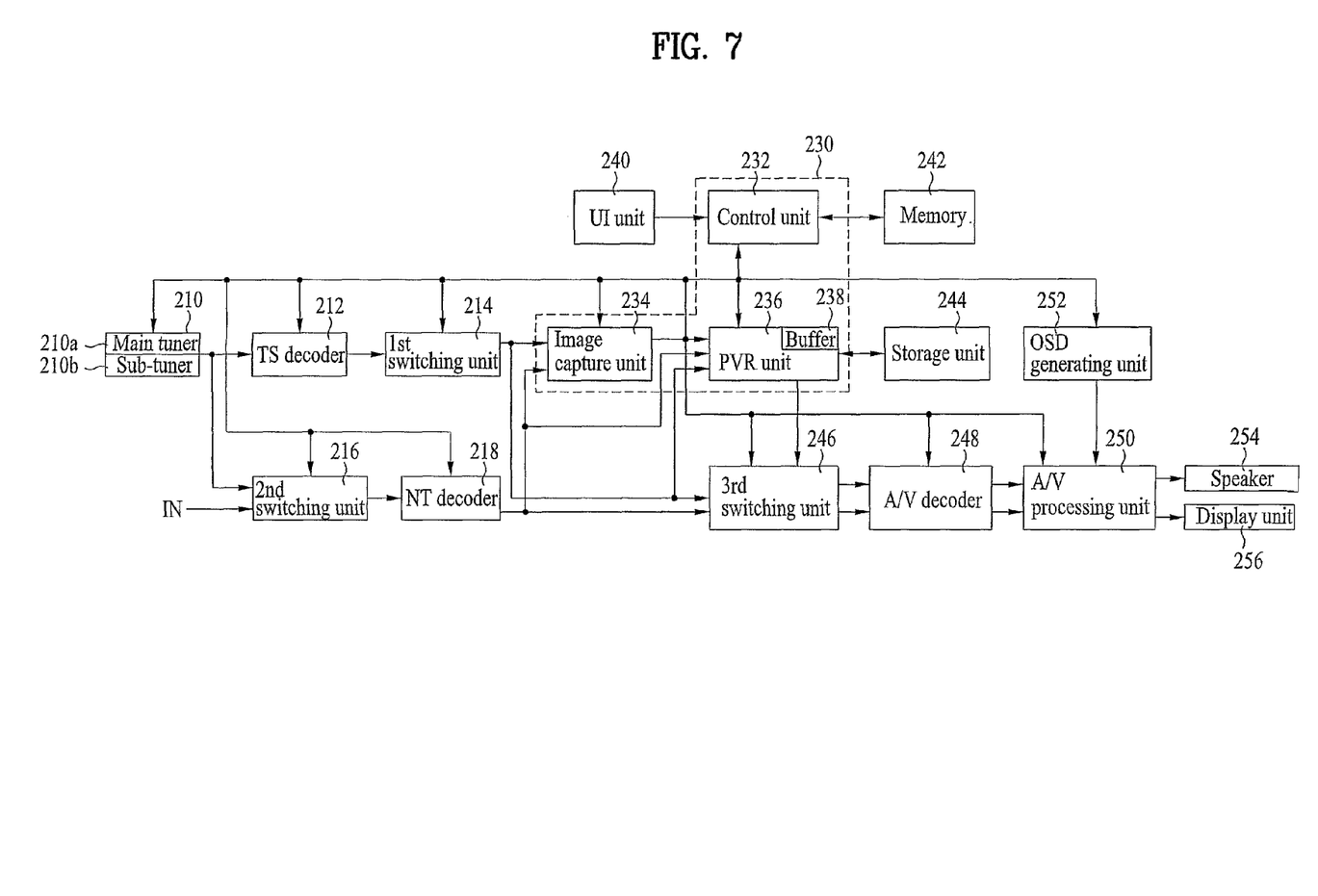
FIG. 7 is a block diagram of a television according to one embodiment of the present invention.

FIG. 7 is a schematic block diagram of a television according to one embodiment of the present invention.

Referring to FIG. 7, a television (TV) according to one embodiment of the present invention includes a tuning unit 210, a transport stream (TS) decoder 212, a first switching unit 214, a second switching unit 216, a third switching unit 246, an NT or NTSC decoder 218, a central processing unit 230, a user interface unit 240, a memory 242, a storage unit 244, an audio/video (A/V) decoder 248, an A/V processing unit 250, an OSD generating unit 252, a speaker 254, and a display unit 256.

In particular, the tuning unit 210 selects a station of a broadcast channel by tuning a broadcast signal inputted via terrestrial or cable under the control of the central processing unit 230. The tuning unit 210 outputs a digital signal of the broadcast signal received on the selected broadcast channel to the TS decoder 212 and an analog signal of the broadcast signal to the NT decoder 218. And, the tuning unit 210 includes at least one main tuner 210a and at least one sub-tuner 210b.

The TS decoder 212 decodes the digital broadcast signal provided by the tuning unit 210 into an audio stream, a video stream, and a data stream and then outputs the corresponding streams to the first switching unit 214. The first switching unit 214 outputs the audio stream, the video stream and the data stream to the central processing unit 230 and the third switching unit, under the control of the central processing unit 230. The second switching unit 216 is provided with the analog broadcast signal provided by the tuning unit 210 and an external analog input signal received via an input terminal IN. The second switching unit 216 selects either the analog broadcast signal or the external analog input signal under the control of the central processing unit 230 and then provides the selected signal to the NT decoder 218.

The NT decoder 218 decodes the analog broadcast signal or the external analog input signal received from the second switching unit 216 into audio data and video data and then outputs the decoded result to the central processing unit 230 and the third switching unit 246.

The central processing unit 230 plays a role in controlling the TV overall. The central processing unit 230 can include a control unit 232 and an image capture unit 234. In case that the TV shown in FIG. 7 includes a personal video recorder capable of storage and playback of broadcast data, the central processing unit 230 can further include a PVR unit 236. Under the control of the control unit 232, the image capture unit 234 captures a program image signal of a preferred channel by a preset time interval for each preset number of frames using the video stream of the preferred channel received from the first switching unit 214 or the decoded video data of the preferred channel received from the NT decoder 218, until a received program of the preferred channel ends. For instance, the image capture unit 234 is able to repeatedly capture a video signal of a received program of a preferred channel by a prescribed interval for each frame. The memory 242 stores various kinds of information including a system program of the control unit 232. The PVR unit 236 is provided with the audio, video and data streams of the digital broadcast signal by the first switching unit 214 and then stores the provided streams in a storage unit 244, using the buffer 238, under the control of the central unit 232. Alternatively, the PVR unit 236 is provided with the audio and video data of the analog broadcast signal by the NT decoder 218, MPEG-encodes the provided audio and video data into audio and video streams, and then stores the MPEG-encoded streams in the storage unit 244 under the control of the central unit 232. In this case, the storage unit 244 is a hard disc drive (HDD) including a hard disc and stores a received broadcast program therein.

The user interface unit 240 includes a keypad provided to a TV body, a remote controller of the TV, or the like. The user interface unit 240 transfers various commands or information inputted by a user to the control unit 232. The third switching unit 246 selects at least one of a digital broadcast program received via the tuning unit 210, an analog digital broadcast program received via the tuning unit 210, a stored broadcast program provided by the PVR unit 236 under the control of the control unit 232 and then provides the at least one selected program to the A/V decoder 248. If video and audio streams are provided by the third switching unit 246, the A/V decoder 248 decodes the video and audio streams into video and audio data and then outputs the decoded result to the A/V processing unit 250. Yet, in case of being provided with video and audio data, the A/V decoder 248 intactly bypasses the video and audio data to the A/V processing unit 250. The A/V processing unit 250 processes at least one audio and video data provided by the A/V decoder 248 and then outputs the processed audio data and the processed video data to the speaker 254 and the display unit 256, respectively. And, the A/V processing unit 250 mixes OSD data, which is provided by the control unit 232 via the OSD generating unit 252, with the video data and then provides the mixing result to the display unit 256.

The TV shown in FIG. 7 caries out the preferred channel providing method shown in FIG. 2, FIG. 5, and FIG. 6 in the following manner.

First of all, if a user sets a number of a preferred channel via a channel number key (not shown in the drawings) of the user interface unit 240, the user interface unit 240 outputs the number of the preferred channel set by the user to the control unit 232. The control unit 232 then controls the number of the preferred channel to be stored in at least one of the memory 242, the buffer 238, and the storage unit 244 (step S50 or S182). Optionally, the user is able to set a preference priority of each preferred channel by manipulating a preference priority setting key (not shown in the drawings) of the user interface unit 240. In this case, the preference priority set by the user is stored by being interconnected with a preferred channel number.

The control unit 232 checks a mode of the TV. If the TV is in a turn-on mode, the control unit 232 controls a program of a channel currently viewed by the user to be received via the main tuner 210a. If the TV is in the turn-on mode, the control unit 232 also controls the sub-tuner 210b to receive a program of a preferred channel (S52 or S184). The control unit 232 interprets the preferred channel number set and stored by the user, decides, according to the interpretation result, a channel to be selected by the main tuner 210a and a channel to be selected by the sub-tuner 210b, generates the decided result as a tuning control signal, and then outputs the tuning control signal to the tuning unit 210. In particular, the sub-tuner 210b receives a program received on a preferred channel in response to the tuning control signal. If it is checked that the TV is in a warm standby mode, the control unit 232 controls at least one of the tuners 210a and 210b to receive the program of the preferred channel (S150). The central processing unit 230 transforms a program image of the preferred channel into a reduced image and extracts program information from additional data included in the program of the preferred channel (S54, S152, S186). For instance, the control unit 232 or the PVR unit 236 transforms an image captured by the image capture unit 234 into a reduced image and extracts program information using additional data for a program of a preferred channel. The number of the preferred channel set by the user, the preference priority of the preferred channel, the extracted program information, and/or the generated reduced image can be stored in each of the buffer 238, the memory 242, and the storage unit 244 or may be dispersedly stored in the buffer 238, the memory 242, and the storage unit 244. In doing so, under the control of the control unit 232, the program information and the reduced image are stored per the preferred channel.

In case that a request for a switching to a turn-off mode of the TV from a turn-on mode of the TV, a request for a switching to a turn-on mode of the TV from a turn-off mode of the TV, or a request for a display of a preferred channel is made to the user interface unit 240 by the user, the user interface unit 240 generates a preferred channel providing request signal and then outputs the generated signal to the central processing unit 230 (S56, S154, S188). In response to the preferred channel providing request signal, the central processing unit 230, e.g., the control unit 232 reads out a previously stored reduced image and then displays the read reduced image per the preferred channel on the display unit 256 via the OSD generating unit 252 and the A/V processing unit 250 (S60, S158, S190). According to the aforesaid various kinds of the display methods, the control unit 232 differently operates. Namely, in case that a reduced mage is displayed as shown in FIGS. 3A to 3D, the control unit 232 reads the stored per preferred channel reduced images one by one and then displays the read image on the screen. In case that the reduced image is displayed as shown in FIG. 4A, the control unit 232 reads out four reduced images for four preferred channels and then simultaneously displays the read reduced images on the screen. In case that a reduced image is displayed by FRFD, the control unit 232 controls a reduced image first stored to be first displayed. In case that a reduced image is displayed according to a preference priority, the control unit 232 interprets the preference priority, reads out from a reduced image of a preferred channel having a highest preference priority to that having a lowest preference priority, and then displays the read reduced image. The OSD generating unit 252 performs OSD processing on the per preferred channel reduced image received from the control unit 232 and then puts the OSD processing result to the display unit 256. Prior to executing the steps S60 or S158, the central processing unit 230 decides-whether the user has set a preferred channel mode. If the preferred channel mode is set, the step S60 or S158 is executed. In this case, the channel mode can be set by the user via a preferred channel mode selection key (not shown in the drawings) of the user interface (UI) unit 240. If it is not the preferred channel mode despite the occurrence of the preferred channel providing request signal, the control unit 232 controls the respective units to enable the TV shown in FIG. 7 to enter a turn-off mode, e.g., a warm standby mode (S70). In the warm standby mode, the control unit 232 can control the tuning unit 210, the TS decoder 212, the first switching unit 214, the second switching unit 216, the NT decoder 218, the central processing unit 230, the user interface (UI) unit 240, the memory 242, and the storage unit 224 of the TV shown in FIG. 7 to be operated only but controls the rest of the units to stop operating. Alternatively, if it is not the preferred channel mode despite the occurrence of the preferred channel providing request signal, the control unit 232 controls the respective units to display the program provided on the channel, which is previously viewed last before the TV enters the turn-off mode, on the whole screen (S168). For this, the program, which was viewed last by the user before the TV is turned off, can be stored in the corresponding unit 242, 238, or 244 of the TV.

In case that the user selects a random one of the displayed reduced images via a selection key (not shown in the drawings) of the user interface unit 240, the user interface unit 240 generates a preferred channel selection signal indicating the selected reduced image and then outputs the generated signal to the central processing unit 230 (S62, S160, S192). In response to the preferred channel selection signal, the control unit 232 displays program information for the preferred channel corresponding to the selected reduced image on the display unit 256 via the OSD generating unit 252 and the A/V processing unit 250 (S64, S162, S194). And, the control unit 232 controls the OSD generating unit 252 to enable the reduced image selected by the user to be displayed by being discriminated from other reduced images unselected by the user.

When the user confirms the selected reduced image via a confirmation key (not shown in the drawings) of the user interface unit 240, the user interface unit 240 generates a preferred channel confirmation signal and then outputs the generated signal to the central processing unit 230 (S66, S164, S196). In response to the preferred channel confirmation signal, the control unit 232 controls the main tuner 210a to receive a program of the preferred channel corresponding to the confirmed reduced image (S68, S166, S198). So, the program of the preferred channel corresponding to the reduced image selected and confirmed by the user, as shown in FIG. 4C, is displayed on the screen.

Accordingly, the present invention provides the following effects or advantages.

First of all, in the broadcast receiver and the preferred channel providing method there of according to the present invention, when a turn-on mode of the broadcast receiver is switched to a turn-off mode of the broadcast receiver, when a turn-off mode of the broadcast receiver is switched to a turn-on mode of the broadcast receiver, or when a display of a preferred channel is requested in a turned-on mode, a per preferred channel reduced image is displayed as OSD on a currently viewed image. So, a user is facilitated to recognize and select a program received on the preferred channel without blocking the currently viewed image. Hence, by providing a per preferred channel reduced image before a user turns off a power of the broadcast receiver, it is able to prevent the user from missing a viewing of an important program. Since a per preferred channel reduced image is provided when the power of the broadcast receiver is turned on, the user is able to select a specific preferred channel quickly each time the power is turned on.

A recording medium readable by a computer includes one of all kinds of storage devices in which data readable by a computer system are stored. As an example of the recording medium readable by a computer, there is ROM, RAM, CD- ROM, a magnetic tape, a floppy disc, an optical data storage device, or the like. And, the computer-readable recording medium also includes a recording medium implemented in a carrier wave format (e.g., transmission via Internet). And, the computer-readable recording medium can store codes, which are spread to a computer system connected via a network and a readable by spreading, to execute. And, a function program, code and code segments for the implementation of a user tracking method are easily inferred from programmers in the art of the present invention.

INDUSTRIAL APPLICABILITY

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A method of providing a preferred channel in a broadcast receiver, comprising:
  receiving a program of the preferred channel set by a user among a plurality of broadcast channels;
  transforming an image of the received program of the preferred channel into a reduced image;
  storing the reduced image per the preferred channel;
  when receiving a request for switching to a turn-off mode disabling a user to view a program, displaying the stored reduced image;
  identifying whether a request for selecting the displayed image is received within a preset amount of time;
  when the request for selecting the displayed image is received within the preset amount of time, displaying program information corresponding to the selected image; and
  when the request for selecting the displayed image is not received within the preset amount of time, cutting off power to a display panel,
  wherein a plurality of reduced images are displayed on a main screen in response to the request for switching to a turn-off mode,
  a program information corresponding to a selected reduced image is displayed when one of the plurality of reduced images is selected, and
  the program information at least partially overlaps all of the plurality of reduced images displayed on the main screen,
  wherein the plurality of reduced images overlap a center region of a main screen, and the program information overlaps a center region of a field including the reduced images.

2. The method of claim 1, wherein the displaying the stored reduced image comprises displaying the stored reduced image per the preferred channel.

3. The method of claim 2, wherein when the user makes a request for a display of the preferred channel, the stored reduced image is displayed.

4. The method of claim 1, wherein when the broadcast receiver having at least two tuners is in the turn-on mode, the program of the preferred channel and a program currently displayed are received via the at least two tuners, respectively, and wherein, when the broadcast receiver is in the turn-off mode, the program of the preferred channel is received via one of the at least two tuners.

5. The method of claim 2, wherein a plurality of the reduced images respectively corresponding to a plurality of the preferred channels are sequentially displayed one by one.

6. The method of claim 2, wherein a plurality of the reduced images respectively corresponding to a plurality of the preferred channels are sequentially and simultaneously displayed two by two at least.

7. The method of claim 6, wherein a number of the reduced images to be simultaneously displayed is decided in advance.

8. The method of claim 2, wherein a plurality of the reduced images corresponding to the preferred channel are sequentially displayed by First Record First Display (FRFD) for a predetermined period.

9. The method of claim 2, wherein the reduced image is displayed in order of a preference priority of the preferred channel set by the user.

10. The method of claim 1, wherein a size of the reduced image is decided in advance.

11. The method of claim 1, the method is carried out while the broadcast receiver is in a warm standby mode.

12. A method of providing a preferred channel in a broadcast receiver, comprising:
  receiving a program of the preferred channel among a plurality of broadcast channels;
  transforming an image of the received program of the preferred channel into a reduced image, extracting program information for the preferred channel from additional data included in the received program of the preferred channel;
  storing the reduced image and the extracted program information per the preferred channel;
  when receiving a request for switching to a turn-off mode disabling a user to view a program, displaying the stored reduced image per the preferred channel;
  identifying whether a request for selecting the displayed image is received within a preset amount of time;
  when the request for selecting the displayed image is received within the preset amount of time, displaying the extracted program information for the preferred channel corresponding to the selected image; and
  when the request for selecting the displayed image is not received within the preset amount of time, cutting off power to a display panel,
  wherein a plurality of reduced images are displayed on a main screen in response to the request for switching to a turn-off mode,
  a program information corresponding to a selected reduced image is displayed when one of the plurality of reduced images is selected, and
  the program information for the selected reduced image at least partially overlaps all of the plurality of reduced images displayed on the main screen,
  wherein the plurality of reduced images overlap a center region of a main screen, and the program information overlaps a center region of a field including the reduced images.

13. The method of claim 12, wherein the selected reduced image is displayed by being discriminated from other reduced images.

14. The method of claim 12, wherein when the user confirms the selected reduced image, the program of the preferred channel corresponding to the reduced image confirmed by the user is displayed.

15. The method of claim 12, wherein when the user makes a request for a display of the preferred channel, the stored reduced image is displayed.

16. A broadcast receiver, which performs a preferred channel providing method, the broadcast receiver comprising:
at least one main tuner receiving a program currently displayed;
at least one sub-tuner receiving a program of a preferred channel in response to a tuning control signal; and
a central processing unit generating the tuning control signal according to the preferred channel among a plurality of broadcast channels, the central processing unit transforming an image of the received program of the preferred channel into a reduced image, controlling display of the stored reduced image when receiving a request for switching to a turn-off mode disabling a user to view a program, identifying whether a request for selecting the displayed image is received within a preset amount of time, controlling display of program information corresponding to the selected image when the request for selecting the displayed image is received within the preset amount of time, and cutting off power to a display panel when the request for selecting the displayed image is not received within the preset amount of time,
wherein a plurality of reduced images are displayed on a main screen in response to the request for switching to a turn-off mode,
a program information corresponding to a selected reduced image is displayed when one of the plurality of reduced images is selected, and
the program information at least partially overlaps all of the plurality of reduced images displayed on the main screen,
wherein the plurality of reduced images overlap a center region of a main screen, and the program information overlaps a center region of a field including the reduced images.

17. The broadcast receiver of claim 16, further comprising a display unit displaying the reduced image under a control of the central processing unit.

18. The broadcast receiver of claim 17, further comprising a user interface unit having a number of the preferred channel set by the user, the user interface unit outputting the number of the preferred channel to the central processing unit.

19. The broadcast receiver of claim 18, wherein the user interface unit generates a preferred channel providing request signal by receiving a request for a display of the preferred channel, a request for a switching to the turn-off mode of the broadcast receiver from the turn-on mode of the broadcast receiver, or a request for the switching to the turn-on mode of the broadcast receiver from the turn-off mode of the broadcast receiver from the user and the central processing unit controls display of the reduced image per the preferred channel on the display unit in response to the preferred channel providing request signal.

20. The broadcast receiver of claim 16, wherein while the broadcast receiver is in a warm standby mode, at least one of the main tuner and the sub-tuner receives the program of the preferred channel under a control of the central processing unit and wherein the central processing unit transforms the image of the received program of the preferred channel into the reduced image.

21. The broadcast receiver of claim 16, the central processing unit comprising:
an image capture unit capturing the image of the program of the preferred channel for each preset time interval;
a control unit transforming the image captured by the image capture unit into the reduced image, the control unit generating the tuning control signal; and
a personal video recorder (PVR) unit storing the reduced image per the preferred channel.

22. The broadcast receiver of claim 16, the central processing unit comprising:
an image capture unit capturing the image of the program of the preferred channel for each preset time interval;
a control unit generating the tuning control signal; and
a personal video recorder (PVR) unit transforming the image captured by the image capture unit into the reduced image, the personal video recorder (PVR) unit storing the reduced image per the preferred channel.

23. A broadcast receiver, which performs a preferred channel providing method, the broadcast receiver comprising:
at least one main tuner receiving a program currently viewed by a user;
at least one sub-tuner receiving a program of a preferred channel in response to a tuning control signal;
a central processing unit generating the tuning control signal according to a number of the preferred channel set by the user among a plurality of broadcast channels, the central processing unit transforming an image of the received program of the preferred channel into a reduced image, the central processing unit extracting program information for the preferred channel from additional data included in the received program of the preferred channel;
a display unit displaying the reduced image under a control of the central processing unit; and
a user interface unit having a number of the preferred channel set by the user, the user interface unit outputting the number of the preferred channel to the central processing unit,
wherein the central processing unit controls display of the stored reduced images when receiving a request for switching to a turn-off mode disabling a user to view a program, identifies whether a request for selecting the displayed image is received within a preset amount of time, controls display of program information corresponding to the selected image when the request for selecting the displayed image is received within the preset amount of time, and cuts off power to a display panel when the request for selecting the displayed image is not received within the preset amount of time,
wherein a plurality of reduced images are displayed on a main screen in response to the request for switching to a turn-off mode,
a program information corresponding to a selected reduced image is displayed when one of the plurality of reduced images is selected, and
the program information for the selected reduced image at least partially overlaps all of the plurality of reduced images displayed on the main screen,
wherein the plurality of reduced images overlap a center region of a main screen, and the program information overlaps a center region of a field including the reduced images.

24. The broadcast receiver of claim 23, wherein the user interface unit has one of the displayed reduced images selected by the user and then generates a preferred channel selection signal indicating the selected reduced image and wherein the central processing unit controls display of the program information for the preferred channel corresponding to the selected reduced image via the display unit in response to the preferred channel selection signal.

25. The broadcast receiver of claim 24, wherein the user interface unit has the selected reduced image confirmed by the user and then generates a preferred channel confirmation signal indicating the confirmed reduced image and wherein the central processing unit controls the main tuner to receive the program of the preferred channel corresponding to the confirmed reduced image in response to the preferred channel confirmation signal.

26. The broadcast receiver of claim 23, wherein the central processing unit controls at least one of the reduced image, the number of the preferred channel, and the program information to be stored per the preferred channel.

27. The broadcast receiver of claim 23, further comprising a memory storing at least one of the reduced image, the number of the preferred channel, and the program information received from the central processing unit per the preferred channel.

28. The broadcast receiver of claim 23, further comprising a storage unit storing at least one of the reduced image, the number of the preferred channel, and the program information received from the central processing unit per the preferred channel.

29. The broadcast receiver of claim 23, wherein the user interface unit generates a preferred channel providing request signal by receiving a request for a display of the preferred channel, a request for a switching to the turn-off mode of the broadcast receiver from the turn-on mode of the broadcast receiver, or a request for the switching to the turn-on mode of the broadcast receiver from the turn-off mode of the broadcast receiver from the user and the central processing unit controls display of the reduced image per the preferred channel on the display unit in response to the preferred channel providing request signal.

30. The method of claim 1, wherein a size of the displayed reduced image is based on a number of reduced images to be simultaneously displayed.

31. A method of providing a preferred channel in the broadcast receiver, comprising:

receiving a program of the preferred channel set by a user among a plurality of broadcast channels;

transforming an image of the received program of the preferred channel into a reduced image;

storing the reduced image per the preferred channel;

when receiving a request for switching to a turn-on mode of the broadcast receiver from a turn-off mode of the broadcast receiver, displaying the stored reduced image; and identifying whether a request for selecting the displayed reduced image is received within a preset amount of time, and displaying the program of the preferred channel corresponding to the selected reduced image when the request is received within the preset amount of time, wherein a plurality of reduced images are displayed on a main screen in response to the request for switching to a turn-off mode, a program information corresponding to a selected reduced image is displayed when one of the plurality of reduced images is selected, and the program information at least partially overlaps all of the plurality of reduced images displayed on the main screen, wherein the plurality of reduced images overlap a center region of a main screen, and the program information overlaps a center region of a field including the reduced images.

32. The method of claim 31, wherein a size of the displayed reduced image is based on a number of reduced images to be simultaneously displayed.

33. The method of claim 1, wherein the program information partially overlaps each of the plurality of reduced images at the center region of the field including the reduced images such that at least a portion of each of the reduced images is visible.

* * * * *